United States Patent
Hirose et al.

(10) Patent No.: US 10,833,323 B2
(45) Date of Patent: Nov. 10, 2020

(54) NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE MATERIAL FOR NON-AQUEOUS ELECTROLYTE SECONDARY BATTERY

(71) Applicant: SHIN-ETSU CHEMICAL CO., LTD., Tokyo (JP)

(72) Inventors: Takakazu Hirose, Annaka (JP); Hiromichi Kamo, Takasaki (JP); Takumi Matsuno, Annaka (JP); Reiko Sakai, Takasaki (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 170 days.

(21) Appl. No.: 16/077,951

(22) PCT Filed: Jan. 30, 2017

(86) PCT No.: PCT/JP2017/003182
§ 371 (c)(1),
(2) Date: Aug. 14, 2018

(87) PCT Pub. No.: WO2017/145654
PCT Pub. Date: Aug. 31, 2017

(65) Prior Publication Data
US 2019/0214637 A1    Jul. 11, 2019

(30) Foreign Application Priority Data

Feb. 24, 2016  (JP) .................................. 2016-033557
Sep. 29, 2016  (JP) .................................. 2016-192233

(51) Int. Cl.
  *H01M 4/36*    (2006.01)
  *H01M 4/485*   (2010.01)
  (Continued)

(52) U.S. Cl.
  CPC ......... *H01M 4/366* (2013.01); *H01M 4/0428* (2013.01); *H01M 4/0471* (2013.01);
  (Continued)

(58) Field of Classification Search
  CPC .... H01M 4/366; H01M 4/485; H01M 4/5825; H01M 4/587; H01M 4/131;
  (Continued)

(56) References Cited

U.S. PATENT DOCUMENTS 5,395,711 A   3/1995  Tahara et al.
5,494,762 A   2/1996  Isoyama et al.
(Continued)

FOREIGN PATENT DOCUMENTS

CN   102315446 A   1/2012
CN   103229338 A   7/2013
(Continued)

OTHER PUBLICATIONS

Mar. 7, 2017 International Search Report issued in International Patent Application PCT/JP2017/003182.
(Continued)

*Primary Examiner* — Gregg Cantelmo
(74) *Attorney, Agent, or Firm* — Oliff PLC (57) ABSTRACT

A negative electrode active material for a non-aqueous electrolyte secondary battery, wherein the negative electrode active material includes negative electrode active material particles, the negative electrode active material particles include a silicon compound particle which includes a silicon compound including oxygen, the silicon compound particle includes a Li compound, and the silicon compound particle (Continued)

is adhered with a phosphate salt in an outermost surface layer thereof. With this, the negative electrode active material which is high in the capacity and the stability to aqueous slurry as well as excellent in the cycle characteristic and the first efficiency can be provided.

12 Claims, 1 Drawing Sheet (51) Int. Cl.
  *H01M 4/1391* (2010.01)
  *H01M 4/62* (2006.01)
  *H01M 4/04* (2006.01)
  *H01M 4/58* (2010.01)
  *H01M 4/587* (2010.01)
  *H01M 10/0525* (2010.01)
  *H01M 4/02* (2006.01)

(52) U.S. Cl.
  CPC ......... *H01M 4/1391* (2013.01); *H01M 4/485* (2013.01); *H01M 4/587* (2013.01); *H01M 4/5825* (2013.01); *H01M 4/62* (2013.01); *H01M 4/625* (2013.01); *H01M 10/0525* (2013.01); *H01M 2004/027* (2013.01)

(58) Field of Classification Search
  CPC ...... H01M 4/1391; H01M 4/58; H01M 4/136; H01M 4/1397; H01M 10/0525
  See application file for complete search history.

(56) References Cited

U.S. PATENT DOCUMENTS

| | | | |
|---|---|---|---|
| 6,093,503 | A | 7/2000 | Isoyama et al. |
| 7,459,236 | B2 | 12/2008 | Konishiike et al. |
| 8,377,592 | B2 | 2/2013 | Jeong et al. |
| 2006/0099507 | A1 | 5/2006 | Kogetsu et al. |
| 2007/0224508 | A1 | 9/2007 | Aramata et al. |
| 2008/0176137 | A1 | 7/2008 | Endo et al. |
| 2009/0202911 | A1 | 8/2009 | Fukuoka et al. |
| 2010/0009261 | A1 | 1/2010 | Watanabe |
| 2012/0003529 | A1* | 1/2012 | Yamakaji ............ H01M 4/0471 429/211 |
| 2013/0244118 | A1 | 9/2013 | Onizuka |
| 2016/0233484 | A1 | 8/2016 | Hirose et al. |
| 2016/0285091 | A1 | 9/2016 | Iriyama et al. |
| 2016/0351947 | A1 | 12/2016 | Kamo et al. |

FOREIGN PATENT DOCUMENTS

| | | |
|---|---|---|
| EP | 2 922 120 A1 | 9/2015 |
| JP | H106-290773 A | 10/1994 |
| JP | 2997741 B2 | 1/2000 |
| JP | 2001-185127 A | 7/2001 |
| JP | 2002-042806 A | 2/2002 |
| JP | 2006-114454 A | 4/2006 |
| JP | 2006-164954 A | 6/2006 |
| JP | 2007-234255 A | 9/2007 |
| JP | 2008-177346 A | 7/2008 |
| JP | 2008-251369 A | 10/2008 |
| JP | 2008-282819 A | 11/2008 |
| JP | 2009-070825 A | 4/2009 |
| JP | 2009-205950 A | 9/2009 |
| JP | 2009-212074 A | 9/2009 |
| JP | 2010-021100 A | 1/2010 |
| JP | 2010-092830 A | 4/2010 |
| JP | 2014-82118 A | 5/2014 |
| JP | 2014-203687 A | 10/2014 |
| JP | 2015-149224 A | 8/2015 |
| WO | 2015/025443 A1 | 2/2015 |
| WO | 2015125784 A1 | 8/2015 |

OTHER PUBLICATIONS

Aug. 28, 2018 International Preliminary Report on Patentability issued in International Patent Application PCT/JP2017/003182.
Sep. 19, 2019 Extended Search Report issued in European Patent Application No. 17756096.8.
Jun. 4, 2019 Office Action issued in Japanese Patent Application No. 2016-192233.
May 15, 2020 Office Action issued in Taiwanese Patent Application No. 106104220.
Sep. 2, 2020 Office Action issued in Chinese Patent Application No. 201780013600.3.

* cited by examiner

NEGATIVE ELECTRODE ACTIVE MATERIAL FOR NON-AQUEOUS ELECTROLYTE SECONDARY BATTERY, NON-AQUEOUS ELECTROLYTE SECONDARY BATTERY, AND METHOD FOR PRODUCING NEGATIVE ELECTRODE MATERIAL FOR NON-AQUEOUS ELECTROLYTE SECONDARY BATTERY

TECHNICAL FIELD

The present invention relates to a negative electrode active material for a non-aqueous electrolyte secondary battery, a non-aqueous electrolyte secondary battery, and a method for producing a negative electrode material for a non-aqueous electrolyte secondary battery.

BACKGROUND ART

In recent years, small electronic equipment represented by a mobile terminal is widely used, whereby further downsizing, reduction in the weight, and prolonged life are strongly requested. To meet the market needs as mentioned above, a secondary battery which can especially achieve downsizing, reduction in the weight, and high energy density is being developed. This secondary battery is being investigated for application not only to small electronic equipment but also to large electronic equipment represented by an automobile as well as a power storage system represented by a house.

Among them, a lithium ion secondary battery has high expectation because not only downsizing and increase in the storage capacity can be easily achieved but also a high energy density can be obtained as compared with a lead battery or a nickel cadmium battery.

The lithium ion secondary battery as mentioned above comprises a positive electrode, a negative electrode, a separator, and an electrolyte solution, wherein the negative electrode thereof includes a negative electrode active material which involves in the charge and discharge reactions.

In the negative electrode active material, a carbon material is widely used, wherein a further increase in the battery capacity is requested from recent market needs. In order to increase the battery capacity, as the material for the negative electrode active material, use of silicon is being studied. This is because a significant increase in the battery capacity can be expected with silicon, for the theoretical capacity of silicon (4199 mAh/g) is more than 10 times as much as the theoretical capacity of graphite (372 mAh/g). Research and development of a silicon material as the material for the negative electrode active material are carried out with regard not only to element silicon but also to compounds represented by an alloy and an oxide thereof. Besides, with regard to the form of the active material, the study is being made from a coating type which is standard in the carbon material to an integral type directly deposited onto a current collector.

However, when silicon is used as a main raw material in the negative electrode active material, the negative electrode active material undergoes expansion and contraction during charge and discharge, so that a crack can readily occur mainly near to surface of the negative electrode active material. In addition, inside the active material an ionic substance, which can cause a crack in the negative electrode active material, is formed. When surface of the negative electrode active material is cracked, a new surface is formed so that the reactive area of the active material increases. At this time, not only a decomposition reaction of the electrolyte solution takes place on the new surface but also the electrolyte solution is consumed because a film of the decomposition product of the electrolyte solution is formed on the new surface. Accordingly, the cycle property can be readily deteriorated.

Until today, in order to improve a battery's initial efficiency and a cycle characteristic, various investigations have been made with regard to the electrode configuration as well as the negative electrode material for the lithium ion secondary battery mainly composed of a silicon material.

Specifically, in order to obtain an excellent cycle characteristic and a high safety, silicon and amorphous silicon dioxide are simultaneously deposited by using a gas method (for example, see Patent Document 1). In order to obtain high battery capacity and safety, a carbon material (electronic conductive material) is disposed on surface of silicon oxide particle (for example, see Patent Document 2). In order to improve the cycle characteristic as well as to obtain the high input/output characteristics, an active material including silicon and oxygen is produced, and also an active material layer having a high oxygen ratio near the current collector is formed (for example, see Patent Document 3). In order to improve the cycle characteristic, the silicon active material is made so as to contain oxygen with an average oxygen content of 40 at % or less and also to have a higher oxygen content near the current collector (for example, see Patent Document 4).

In order to improve a first charge and discharge efficiency, a nano composite including an Si phase, $SiO_2$, and $M_yO$ metal oxide is used (for example, see Patent Document 5). In order to improve the cycle characteristic, a mixture of $SiO_x$ ($0.8 \leq x \leq 1.5$ and particle size range of 1 to 50 μm) with a carbon material is burned at high temperature (for example, see Patent Document 6). In order to improve the cycle characteristic, a molar ratio of oxygen to silicon in the negative electrode active material is made 0.1 to 1.2, and the active material is controlled such that the difference between the maximum and minimum values of the molar ratio near the interface of the active material and the current collector is in the range of 0.4 or less (for example, see Patent Document 7). In order to improve the battery load characteristics, a metal oxide including lithium is used (for example, see Patent Document 8). In order to improve the cycle characteristic, a hydrophobic layer of a silane compound or the like is formed on the silicon material surface layer (for example, see Patent Document 9).

In order to improve the cycle characteristic, silicon oxide is used, and on the surface layer thereof a graphite film is formed so as to provide conductivity (for example, see Patent Document 10). In Patent Document 10, with regard to the shift values obtained from the Raman spectrum of the graphite film, broad peaks are appeared at 1330 $cm^{-1}$ and 1580 $cm^{-1}$ with the intensity ratio $I_{1330}/I_{1580}$ being $1.5 < I_{1330}/I_{1580} < 3$. In order to obtain a high battery capacity and to improve the cycle characteristic, particles having a silicon microcrystal phase dispersed in silicon dioxide are used (for example, see Patent Document 11). In order to improve the over-charge and over-discharge characteristics, a silicon oxide in which an atom number ratio of silicon to oxygen is controlled at 1:y ($0<y<2$) is used (for example, see Patent Document 12). Also, in order to obtain a high battery capacity as well as to improve the cycle characteristic, a mixed electrode of silicon and carbon is prepared, wherein a ratio of silicon therein is designed to be 5% or more by weight and 13% or less by weight (for example, see Patent Document 13).

CITATION LIST

Patent Literature

Patent Document 1: Japanese Patent Laid-Open Publication No. 2001-185127
Patent Document 2: Japanese Patent Laid-Open Publication No. 2002-042806
Patent Document 3: Japanese Patent Laid-Open Publication No. 2006-164954
Patent Document 4: Japanese Patent Laid-Open Publication No. 2006-114454
Patent Document 5: Japanese Patent Laid-Open Publication No. 2009-070825
Patent Document 6: Japanese Patent Laid-Open Publication No. 2008-282819
Patent Document 7: Japanese Patent Laid-Open Publication No. 2008-251369
Patent Document 8: Japanese Patent Laid-Open Publication No. 2008-177346
Patent Document 9: Japanese Patent Laid-Open Publication No. 2007-234255
Patent Document 10: Japanese Patent Laid-Open Publication No. 2009-212074
Patent Document 11: Japanese Patent Laid-Open Publication No. 2009-205950
Patent Document 12: Specification in Japanese Patent No. 2997741
Patent Document 13: Japanese Patent Laid-Open Publication No. 2010-092830

SUMMARY OF INVENTION

Technical Problem

As mentioned above, in recent years, in small mobile equipment represented by, for example, electronic equipment, enhancement of performance and multi-functionalization are being progressing, wherein an increase in the battery capacity is requested in a lithium ion secondary battery, which is a main power source thereof. As one means to solve this problem, the lithium ion secondary battery provided with a negative electrode using a silicon material as a main material thereof is requested to be developed.

In addition, in the lithium ion secondary battery using the silicon material, battery characteristics that are almost equivalent to those of the lithium ion secondary battery using a carbon material are requested. Therefore, by using a silicon oxide modified by insertion and partial release of Li as the negative electrode active material, the cycle retention rate and the first efficiency of the battery have been improved. However, the silicon oxide after Modification is comparatively low in the water resistance because it is modified by using Li. Because of this, stabilization of a slurry, containing the silicon oxide after modification and prepared upon production of a negative electrode, was low; and thus, with passage of time, at odd times, a gas was generated from the slurry, or a sediment (deposit) was formed that is an agglomerate of silicon oxide particles with a binder component. Therefore, there has been a problem that equipment or the like which has been generally used for application of a carbon-based active material could not be used in some cases, or the use thereof was not easy. Accordingly, when the silicon oxide whose initial efficiency and cycle retention rate were improved by modification with Li was used, stability of the water-containing slurry became insufficient; and thus, a negative electrode active material for the non-aqueous electrolyte secondary battery which is advantageous in an industrial production of the secondary battery has not been proposed yet.

The present invention was made in view of the problem as mentioned above; and thus, an object thereof is to provide the negative electrode active material which is high in the capacity and the stability to an aqueous slurry as well as excellent in the cycle characteristic and the first efficiency.

In addition, the present invention has an object to provide a method for producing the negative electrode material which is high in the capacity and the stability to an aqueous slurry as well as excellent in the cycle characteristic and the first efficiency.

Solution to Problem

In order to achieve the object mentioned above, the present invention provides a negative electrode active material for a non-aqueous electrolyte secondary battery, wherein the negative electrode active material includes negative electrode active material particles, the negative electrode active material particles include a silicon compound particle which includes a silicon compound including oxygen, the silicon compound particle includes a Li compound, and the silicon compound particle is adhered with a phosphate salt in an outermost surface layer thereof.

The negative electrode active material of the present invention has a phosphate salt adhered to an outermost surface layer of the silicon compound particle, so that the water resistance thereof is high. Therefore, not only stability of the aqueous slurry which is a mixture with this negative electrode active material and is prepared at the time of producing a negative electrode thereof can be enhanced, but also generation of a gas as well as a sediment can be suppressed. Accordingly, when the negative electrode active material of the present invention is used, a non-aqueous electrolyte secondary battery can be advantageously produced in an industrial production thereof, the battery being excellent in the battery capacity as well as in the cycle retention rate, which are the intrinsic characteristics of a silicon oxide (silicon compound including oxygen) that is modified with Li. Meanwhile, hereinafter, the negative electrode active material particle including the silicon compound particle is also called as the silicon-based active material particle. Likewise, the negative electrode active material including this silicon-based active material particle is also called as the silicon-based active material.

Here, it is preferable that the Li compound is one or more selected from $Li_2SiO_3$ and $Li_2Si_2O_5$.

Because $Li_2SiO_3$ and $Li_2Si_2O_5$ are more difficult to be dissolved in water as compared with $Li_4SiO_4$, it exhibits a comparatively stable behavior in the aqueous slurry; and thus, they are preferable.

Further, it is preferable that the phosphate salt is an aluminum phosphate salt or an ammonium phosphate salt.

The phosphate salts like these are preferable because further higher effects (slurry stability, etc.) can be obtained.

In this case, the aluminum phosphate salt is preferably aluminum phosphate tribasic.

With aluminum phosphate monobasic or with aluminum phosphate dibasic, effects (slurry stability, etc.) above a certain level can be obtained; however, aluminum phosphate tribasic is especially preferable, because further higher effects can be obtained with it.

Also, with regard to the ammonium phosphate salt, at least one of ammonium phosphate and diammonium phosphate is preferable.

These ammonium phosphate salts are especially preferable, because further higher effects can be obtained with these salts.

In addition, the silicon compound particle having both the aluminum phosphate salt and the ammonium phosphate salt adhered to an outermost surface layer thereof is preferable.

The negative electrode active material including the silicon compound particle having two kinds of the phosphate salts adhered to the outermost surface layer thereof as mentioned above is preferable because especially high effects (slurry stability, etc.) can be obtained with them.

In addition, content of the phosphate salt is preferably 0.1% by mass or more and 7% by mass or less relative to the silicon compound particle.

If the content thereof is as mentioned above, an increase in the thixotropy of the slurry that is mixed with the negative electrode active material can be avoided while the effects such as stability of the slurry, etc. are satisfactorily expressed.

In addition, it is preferable to further have a carbon coat layer between the phosphate salt and the silicon compound particle.

Owing to this carbon coat layer, the negative electrode active material that is excellent in conductivity can be obtained.

In addition, a ratio of silicon to oxygen, the elements constituting the silicon compound, is preferably in a range of $0.5 \leq x \leq 1.6$ as $SiO_x$.

The negative electrode active material including the silicon compound as mentioned above, namely, the silicon oxide represented by $SiO_x$ ($0.5 \leq x \leq 1.6$), can give the negative electrode active material having a further enhanced cycle characteristic.

In addition, it is preferable that at least part of an oxygen component that constitutes the silicon compound is present as being bonded to silicon in a state of silicon dioxide, wherein among peaks obtained from a $^{29}Si$-MAS-NMR spectrum, strength of a peak derived from the state of silicon dioxide is smaller than a maximum strength of a peak derived from $Li_2SiO_3$.

In the silicon dioxide component, Li after having been adsorbed therein is difficult to be released, resulting in an irreversible component of the negative electrode active material; and thus, the component thereof is preferably smaller, which means that it is preferable that the peak derived from the state of silicon dioxide is smaller as compared with the peak derived from $Li_2SiO_3$ as the standard.

In addition, it is preferable that in the silicon compound particle, a half width (2θ) of a diffraction peak attributable to a Si(111) crystal surface obtained from an X-ray-diffraction is 1.2° or more, and that a crystallite's size attributable to this crystal surface is 7.5 nm or less.

In the silicon compound particle having the half-value width and the Si crystallite's size as mentioned above, crystallinity thereof is low and abundance of the Si crystal is small, so that the battery characteristics can be enhanced.

In addition, a median size of the silicon compound particle is preferably 0.5 μm or more and 15 μm or less.

If the median size thereof is 0.5 μm or more, an area (area per unit mass of the silicon compound particle) in which a side reaction takes place on surface of the silicon compound particle is so small that Li is not exceedingly consumed; and thus, the cycle retention rate of the battery can be kept high.

If the median size thereof is 15 μm or less, expansion at the time of the Li insertion is so small that breakage as well as crack cannot readily take place. In addition, expansion of the silicon compound particle is so small that the negative electrode active material layer is not easily broken at the time of charging and discharging.

Further, the present invention provides a non-aqueous secondary battery, wherein this battery includes the negative electrode active material for a non-aqueous secondary battery according to the present invention.

The secondary battery as mentioned above not only is excellent in the cycle retention rate and the first efficiency but also can be advantageously produced in an industrial production.

Further, the present invention provides a method for producing a negative electrode material for a non-aqueous electrolyte secondary battery, the negative electrode material including negative electrode active material particles which include a silicon compound particle, the method including:

producing a silicon compound particle which includes a silicon compound including oxygen;

modifying the silicon compound particle by inserting Li into the silicon compound particle; and adhering a phosphate salt on surface of the silicon compound particle after modification, thereby producing the negative electrode material for the non-aqueous electrolyte secondary battery by using the silicon compound particle adhered with the phosphate salt.

The method as mentioned above for producing a negative electrode material for a non-aqueous electrolyte secondary battery can give the negative electrode material which is excellent in the battery capacity as well as the cycle retention rate, which are the intrinsic characteristics of the silicon oxide that is modified with Li. In addition, because the negative electrode material produced by the method as mentioned above includes the silicon compound particle adhered with the phosphate salt, the slurry prepared at the time of producing the negative electrode can be made stable. Namely, the negative electrode material with which the secondary battery can be advantageously produced in an industrial production can be obtained.

Advantageous Effects of Invention

The negative electrode active material of the present invention can increase stability of the slurry prepared at the time of producing the secondary battery; and thus, by using this slurry, a coat film industrially usable can be formed, so that the battery capacity, the cycle characteristic, and the first charge and discharge characteristics can be substantially enhanced. In addition, the secondary battery of the present invention including this negative electrode active material can be advantageously produced in an industrial production, so that the battery capacity, the cycle characteristic, and the first charge discharge characteristics can be enhanced. In addition, by using the secondary battery of the present invention, the same effects as the above effects can also be obtained in electronic equipment, an electric tool, an electric vehicle, a power storage system, and the like.

In addition, according to the method for producing the negative electrode material of the present invention, the negative electrode material which not only can enhance stability of the slurry prepared at the time of producing the secondary battery but also can enhance the battery capacity, the cycle characteristic, and the first charge and discharge characteristics can be produced. Accordingly, the negative electrode material with which the secondary battery having excellent battery characteristics can be advantageously produced in an industrial production can be easily obtained.

DESCRIPTION OF EMBODIMENTS

Hereunder, embodiments of the present invention will be explained; however, the present invention is not limited to them.

As mentioned above, as one method to increase a battery capacity of the lithium ion secondary battery, as the negative electrode of the lithium ion secondary battery, use of a negative electrode mainly using a silicon-based active material is being investigated. It is hoped that the lithium ion secondary battery using this silicon-based active material as the main material thereof has the cycle characteristic and the initial efficiency almost as same as those of the lithium ion secondary battery using a carbon material. However, in the silicon-based active material that is modified with Li in order to obtain the cycle characteristic and the initial efficiency almost as same as those of the lithium ion secondary battery using a carbon material, preparation of a stable slurry is difficult. In the unstable slurry like this, a gas as well as a sediment was formed in a comparatively early stage after preparation of the slurry, so that there has been a problem that production of a high quality negative electrode is difficult.

Therefore, the inventors of the present invention carried out an extensive investigation in order to obtain the negative electrode active material with which a non-aqueous electrolyte secondary battery that is high in the battery capacity as well as excellent in the cycle characteristic and the first efficiency can be readily produced; and as a result, the present invention could be achieved.

The negative electrode active material of the present invention includes negative electrode active material particles. Then, the negative electrode active material particles include a silicon compound particle which includes a silicon compound including oxygen. Also, this silicon compound particle includes a Li compound. Also, in the negative electrode active material of the present invention, the silicon compound particle is adhered with a phosphate salt on an outermost surface layer thereof. Namely, the silicon compound particle has an adherent material (adhesion material) of the phosphate salt on the outermost surface layer thereof. Here, "adhere" is an idea including also "cover". Therefore, in the present invention the phosphate salt may cover at least part of the outermost surface layer of the silicon compound particle. In this case, the silicon compound particle has coat layer of the phosphate salt on the outermost surface layer thereof. The phosphate salt may also be included in a portion other than the outermost surface layer of the silicon compound particle.

In addition, it is preferable that the negative electrode active material of the present invention further has a carbon coat layer between the phosphate salt and the silicon compound particle. When the carbon coat layer (carbon coat film) is included therein, the negative electrode active material which is excellent in the conductivity can be obtained.

Because the negative electrode active material of the present invention has the phosphate salt adhered on the outermost surface layer of the silicon compound particle, a water resistance to the aqueous slurry thereof is high. The conventional aqueous slurry including the silicon compound such as the silicon oxide that is modified by insertion and release of Li changes with passage of time, so that a gas as well as a sediment is formed in an early stage. Because of this, this slurry has not been suitable for mass production of the secondary battery.

In the present invention, however, because the silicon compound particle has the phosphate salt adherent material as mentioned above, the water resistance thereof is increased; and thus, generation of a gas as well as formation of a sediment with passage of time in the slurry is difficult to take place. Because of this, for example, upon applying the slurry onto a current collector, not only a stable film can be obtained, but also the binding property thereof can be enhanced. In addition, in the cation side of the stabilized phosphate salt, reactivity to a carboxyl group of carboxymethyl cellulose (CMC), which is generally used as a binder, is enhanced, so that the binding property thereof is further enhanced.

Accordingly, when the negative electrode active material of the present invention is used, the non-aqueous electrolyte secondary battery having a high battery capacity as well as an excellent cycle retention rate, which are the intrinsic characteristics of the silicon oxide that is modified with Li, can be advantageously produced in an industrial production.

<1. Negative Electrode for the Non-Aqueous Electrolyte Secondary Battery>

Next, composition of the negative electrode of the secondary battery including the negative electrode active material of the present invention as mentioned above will be explained.

[Composition of the Negative Electrode]

Figure 1:
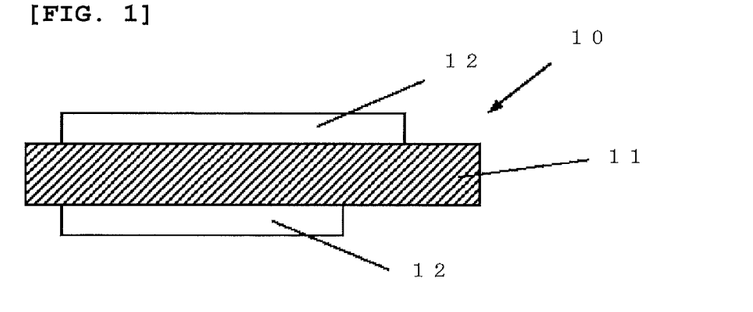
FIG. 1 is a cross-sectional view showing a composition of the negative electrode which includes the negative electrode active material of the present invention.

FIG. 1 is a cross-sectional view of the negative electrode which includes the negative electrode active material of the present invention. As illustrated in FIG. 1, a negative electrode 10 has a composition in which a negative electrode active material layer 12 is arranged on a negative electrode current collector 11. The negative electrode active material layer 12 may be formed on both surfaces of the negative electrode current collector 11, or only on one surface thereof. Further, the negative electrode of the non-aqueous electrolyte secondary battery of the present invention may not have the negative electrode current collector 11.

[Negative Electrode Current Collector]

The negative electrode current collector 11 is an excellent conductive material and formed of a mechanically strong material. Illustrative example of the conductive material that can be used in the negative electrode current collector 11 includes copper (Cu) and nickel (Ni). It is preferable that the conductive material is the material not forming an intermetallic compound with lithium (Li).

It is preferable that the negative electrode current collector 11 includes carbon (C) and sulfur (S), in addition to the main elements. This is because a physical strength of the negative electrode current collector can be increased by so doing. Especially, this is because in the case that an active material layer which expands upon charging is included therein, if the current collector includes the elements mentioned above, deformation of the electrode including the current collector can be suppressed. Contents of these elements are not particularly restricted; but especially, it is preferable that content of each element is 100 ppm by mass or less. This is because a higher effect to suppress the deformation can be obtained.

Surface of the negative electrode current collector 11 may be made rough or not be made rough. Illustrative example of the roughened negative electrode current collector includes a metal foil having been subjected to an electrolysis treatment, an emboss treatment, or a chemical etching treatment. Illustrative example of the negative electrode current collector not being made rough includes a rolled metal foil.

[Negative Electrode Active Material Layer]

The negative electrode active material layer 12 includes the negative electrode active material of the present invention (silicon-based active material); and besides the silicon-based active material, it may include other materials such as a carbon-based active material, as the negative electrode active material. In addition, in view of a battery design, it may include other materials such as a thickener (this is also referred to as "binding material" or "binder") and a conductive additive. Also, the negative electrode active material may be in a form of particle.

As mentioned above, the negative electrode active material of the present invention includes the silicon compound particle which includes the silicon compound including oxygen. The ratio of silicon to oxygen—elements constituting this silicon compound—is preferably in the range of $0.5 \leq x \leq 1.6$ as $SiO_x$. When "x" is equal to 0.5 or more, the cycle characteristic thereof can be enhanced because the oxygen ratio is increased as compared with a single body of silicon. When "x" is equal to 1.6 or less, this is suitable because resistance of the silicon oxide does not become too high.

In addition, in the present invention, crystallinity of the silicon compound is better as it is lower. Specifically, it is preferable that the half-value width (2θ) of the diffraction peak attributable to the Si(111) crystal surface obtained from the X-ray diffraction of the silicon compound particle is 1.2° or more, and that the size of crystallite attributable to this crystal surface is 7.5 nm or less. Especially when the crystallinity thereof is low and abundance of the Si crystal is small as mentioned above, not only the battery characteristics can be enhanced but also a stable Li compound can be produced.

The median size of the silicon compound particle is not particularly restricted; however, it is especially preferable that the median size thereof is 0.5 μm or more and 15 μm or less. This is because when the median size is within the above-mentioned range, not only adsorption and release of the lithium ion upon charging and discharging is facilitated but also the silicon compound particle is difficult to be cracked. When the median size is 0.5 μm or more, because the surface area thereof is not too large so that the side reaction upon charging and discharging does not readily take place; and thus, the battery's irreversible capacity can be decreased. On the other hand, when the median size is 15 μm or less, the silicon-based active material particle is difficult to be cracked thereby suppressing emergence of a new surface; and thus, this range is preferable. Further, among others, the negative electrode active material layer having a generally used mixture of a silicon-based active material with the carbon active material is not readily broken upon charging.

In addition, in the present invention, in the silicon-based active material it is preferable that the Li compound included in the silicon compound particle is one or more selected from $Li_2SiO_3$ and $Li_2Si_2O_5$. Because Li silicates are comparatively stable as compared with other Li compounds, the silicon-based active materials including these Li compounds can give battery characteristics with enhanced stability. These Li compounds can be obtained in the way that part of the $SiO_2$ component formed inside the silicon compound particle is selectively changed to the Li compound so as to modify the silicon compound particle.

Meanwhile, when the silicon oxide is caused to electrochemically react with Li, $Li_4SiO_4$ is also formed; however, $Li_4SiO_4$ is soluble in water comparatively readily, so that when the aqueous slurry is used, this is readily eluted out upon forming the slurry. Therefore, as the Li compound included in the silicon compound particle, $Li_2SiO_3$ or $Li_2Si_2O_5$ is preferable, these being more difficult to be dissolved into water as compared with $Li_4SiO_4$ and thereby showing comparatively stable behavior in the aqueous slurry.

The Li compound inside the silicon compound particle can be quantified by NMR (nuclear magnetic resonance). Measurement of NMR can be done, for example, with the following conditions.

$^{29}$Si MAS NMR (magic angle spinning nuclear magnetic resonance)
Instrument: 700 NMR spectrophotometer (manufactured by Bruker Corp.)
Probe: 4-mm HR-MAS rotor 50 μL
Sample rotation speed: 10 kHz
Measured environment temperature: 25° C.

In the present invention, modification of the silicon compound particle may be done with the method such as an electrochemical method, modification with an oxidation and reduction reaction, and a thermal doping method which is a physical method.

In addition, in the negative electrode active material of the present invention, it is preferable that at least part of an oxygen component that constitutes the silicon compound is present as being bonded to silicon in a state of silicon dioxide, wherein among peaks obtained from the $^{29}$Si-MAS-NMR spectrum, strength of a peak derived from the state of silicon dioxide is smaller than a maximum strength of a peak derived from $Li_2SiO_3$. The silicon compound particle including comparatively large amount of $Li_2SiO_3$ on the basis of the silicon dioxide component as the standard can give sufficient enhancement effects in the battery characteristics due to insertion of Li. The silicon dioxide component is difficult to release Li after adsorbing it, thereby it becomes the irreversible component of the negative electrode active material, so that it is preferable that the content thereof is smaller. Meanwhile, the peak derived from $Li_2SiO_3$ is given near −75 ppm as the chemical shift value obtained from the $^{29}$Si-MAS-NMR spectrum. The peak derived from the silicon dioxide state ($SiO_2$ region) is given in the range of −95 to −150 ppm as the chemical shift value mentioned above.

In the peaks obtained from the $^{29}$Si-MAS-NMR spectrum, it is preferable that the peak derived from the silicon dioxide state is sufficiently smaller than the peak derived from $Li_2SiO_3$; and it is more preferable that the peaks derived from Si, $Li_2Si_2O_5$, and the like, in addition to the peak derived from $Li_2SiO_3$, are also expressed. It is still more preferable that among these peaks, the peak derived from $Li_2SiO_3$ is the largest. Meanwhile, stability of the water resistance is the highest in $Li_2Si_2O_5$, but amount of Li relative to Si is smaller in $Li_2Si_2O_5$ as compared those in $Li_2SiO_3$ and $Li_4SiO_4$; and thus, the enhancement effect thereof to the initial efficiency is not so much. $Li_2SiO_3$ is dissolved slowly into water; but as in the case of the present invention, when the phosphate salt is adhered to the silicon compound particle in the outermost surface layer thereof, the water resistance of the negative electrode active material including this silicon compound particle can be significantly enhanced. Meanwhile, although $Li_4SiO_4$ is the system in which Li is adsorbed most, it is readily soluble in water, so that the adhesion effect of the phosphate salt is decreased as compared with $Li_2SiO_3$ and $Li_2Si_2O_5$.

As described above, in the negative electrode active material of the present invention, the silicon compound particle is adhered with the phosphate salt on the outermost surface layer thereof. The metal included in the phosphate salt is preferably a metal other than Li, whereby illustrative example thereof includes titanium, magnesium, zirconium, and aluminum. When the phosphate salt includes these metals, the aqueous slurry that is mixed with the negative electrode active material of the present invention can be stabilized more. In particular, the phosphate salts of aluminum are preferable. This is because even with titanium, magnesium, or zirconium, effects (slurry stability, etc.) above a certain level can be obtained, but even further higher effects can be obtained by the phosphate salt with aluminum.

In this case, it is preferable that the phosphate salt of aluminum is aluminum phosphate tribasic. With this, the aqueous slurry that is mixed with the negative electrode active material of the present invention is stabilized especially. Meanwhile, even with aluminum phosphate dibasic, or with aluminum phosphate monobasic, effects (slurry stability, etc.) above a certain level can be obtained, but aluminum phosphate tribasic is especially preferable because further higher effects can be obtained with this.

Alternatively, the phosphate salt may be phosphate salts of ammonium. In this case, it is preferable that the phosphate salt of ammonium is at least one of ammonium phosphate and diammonium phosphate. The phosphate salts of ammonium mentioned above are especially preferable because further higher effects can be obtained with them.

In addition, the silicon compound particle having both the aluminum phosphate salt and the ammonium phosphate salt adhered to the outermost surface layer thereof is preferable. The negative electrode active material that includes the silicon compound particle having two kinds of the phosphate salts adhered to the outermost surface layer thereof as mentioned above is preferable because especially high effects (slurry stability, etc.) can be obtained with them.

The content of the phosphate salt is preferably 0.1% by mass or more and 7% by mass or less, relative to the silicon compound particle. When the content of the phosphate salt is 0.1% by mass or more, the effects to the slurry stability, etc., can be fully expressed. When the content of the phosphate salt is 7% by mass or less, thixotropy of the slurry which is mixed with the negative electrode active material is not too high. Therefore, in the negative electrode obtained by using this slurry, the active material layer is difficult to be delaminated, so that the electrode structure is stabilized.

[Method for Producing the Negative Electrode]

Next, one example of the method for producing the negative electrode for the non-aqueous electrolyte second battery will be explained.

First, the negative electrode material included in the negative electrode is prepared. The negative electrode material can be produced by the production method of the present invention, as will be described below. First, the silicon compound particle which includes the silicon compound including oxygen is prepared. Next, the carbon coat layer is formed on surface of the silicon compound particle. However, this process is not essential. Next, Li is inserted into the silicon compound particle so as to modify the silicon compound particle. At this time, part of Li that is inserted into the silicon compound particle may be released. Further, simultaneously at this time, the Li compound may be formed inside as well as on surface of the silicon compound particle.

Next, the silicon compound particle after modification is adhered with the phosphate salt on the surface thereof. Then, by using as the negative electrode active material particle the silicon compound particle like this, mixed with a conductive additive, a binder, or the like, the negative electrode material and the negative electrode can be produced.

The negative electrode material is produced more specifically, for example, by the following procedure.

First, the silicon compound particle which includes the silicon compound including oxygen is prepared. In the following, explanation will be made with regard to the example in which silicon oxide represented by $SiO_x$ ($0.5 \leq x \leq 1.6$) is used as the silicon compound including oxygen. First, a raw material capable of generating a silicon oxide gas is heated in the presence of an inert gas or under reduced pressure in the temperature range of 900 to 1600° C., so as to generate the silicon oxide gas. In this case, considering that the raw material is a mixture of the metal silicon powder and the silicon oxide powder and that oxygen is present on surface of the metal silicon powder as well as minute oxygen is present in a reaction furnace, it is preferable that the molar ratio of the mixture is in the range of 0.8<metal silicon powder/silicon dioxide powder<1.3. The Si crystallite in the particle is controlled by changing the charging range or the gasification temperature, or by the heat treatment after formation thereof. The generated gas is deposited on an adsorbing plate. Under the condition that temperature of the reaction furnace is dropped to 100° C. or lower, the deposited material is taken out from the furnace, and then, the material is crushed and pulverized by using a ball mill, a jet mill, or the like.

Next, a carbon coat layer is formed on surface layer of the powder material (silicon oxide particle) thus obtained. However, this process is not essential. The carbon coat layer is effective to enhance the battery characteristics of the negative electrode active material furthermore.

As to the formation method of the carbon coat layer on the surface layer of the powder material, a thermal decomposition CVD method is preferable. In the thermal decomposition CVD method, the powder material is set in a furnace, which is then filled with a hydrocarbon gas; and then, the temperature inside the furnace is raised. The decomposition temperature is not particularly restricted; however, especially, 1200° C. or lower is preferable, while more preferably 950° C. or lower. With this temperature, an unintended disproportionation of the silicon oxide can be suppressed. The hydrocarbon gas is not particularly restricted; however, in the $C_nH_m$ composition, $3 \geq n$ is preferable. This is because not only the production cost thereof is low, but also physical properties of the decomposition products are excellent.

Next, the silicon oxide particle is modified by inserting Li into the silicon oxide particle. Modification of the silicon oxide particle by insertion and release of Li can be done by using a thermal doping method. In this case, for example, modification can be done by mixing the silicon oxide particle with LiH powder or with Li powder, which is then followed by heating the resulting mixture under a non-oxidizing atmosphere. As to the non-oxidizing atmosphere, for example, an Ar atmosphere or the like may be used. More specifically, first, under an Ar atmosphere, the silicon oxide particle is mixed well with the LiH powder or with the Li powder, and then the resulting mixture is sealed in a vessel; and then, the whole vessel as it is sealed is stirred so as to make the mixture uniform. Thereafter, heating thereof is carried out in the temperature range of 700 to 750° C. so as to carry out the modification. In this case, in order to release part of Li from the silicon oxide particle, the powder after heating is sufficiently cooled down, and then, a method such as washing with an alcohol, a basic aqueous solution in which lithium carbonate is dissolved, a weak acid, or pure water may be used.

Next, the silicon oxide particle after modification is adhered with the phosphate salt on the surface thereof. For example, the phosphate salt can be adhered onto surface of the silicon oxide particle after modification by the method described below (wet mixing method). Namely, the silicon oxide particle is mixed with a liquid which is prepared by dispersing the phosphate salt into ethanol or water; and then, after the resulting mixture is filtrated, the obtained powders are dried, so that the silicon oxide particle after modification can be adhered with the phosphate salt on the surface thereof. At this time, there may also be a possibility that part of lithium silicate included in the silicon oxide particle reacts with the phosphate salt to form a silicate salt. This reaction takes place in accordance with the state of lithium silicate included in the silicon oxide particle. For example, the reaction of the phosphate salt with lithium silicate takes place partially, so that there is a case that phosphate salt not reacted with lithium silicate remains on at least part of surface of the silicon oxide particle or of surface of the carbon coat layer or of both surfaces. Alternatively, there is also a case that the reaction does not take place so that the surface of the silicon oxide particle after modification is adhered with the phosphate salt but not with the silicate salt. In this way, the phosphate salt can be adhered to the surface of the silicon oxide particle after modification. More specifically, for example, by the following procedure, the phosphate salt can be adhered to the surface of the silicon oxide particle after modification.

First, ethanol, the silicon oxide particle after modification, the mass of which corresponds to one fourth of the mass of ethanol, and aluminum phosphate tribasic, the mass of which corresponds to 3.0% by mass of the silicon oxide particle after modification are charged into a vessel; and then, the resulting mixture is stirred for 3.5 hours. After stirring, ethanol is removed by suction filtration; and then, the silicon oxide particle is dried under vacuum at 30° C. for 12 hours. At this time, the mass of the phosphate salt adherent material can be controlled by changing the mass of the aluminum phosphate tribasic that is added simultaneously with the silicon oxide particle after modification. Meanwhile, it is a matter of course that the reaction condition is not limited to the condition mentioned above, so that the amount and kind of the solvent, reaction time, etc., can be arbitrarily changed so far as the phosphate salt can be adhered to the surface of the silicon oxide particle after modification.

The method to adhere the phosphate salt to the surface of the silicon oxide particle is not limited to the wet mixing method mentioned above. For example, the phosphate salt can be adhered to the surface of the silicon oxide particle by the dry mixing method as well. In this case, the phosphate salt can be adhered to the surface of the silicon oxide particle by carrying out the dry mixing of the silicon oxide particle with the phosphate salt by using the known processing equipment (Nobilta® NOB, manufactured by Hosokawa Micron Corp.; Nauta Mixer® DBX, manufacture by Hosokawa Micron Corp.; etc.).

Next, the silicon-based active material particle including the silicon oxide particle having the phosphate salt adherent material as mentioned above is mixed, as needed, with the carbon-based active material. Then, these negative electrode active materials are mixed with other materials such as a binder and the conductive additive so as to obtain a negative electrode mix, which is then followed by addition of an organic solvent, water, or the like to obtain a slurry.

Next, as illustrated in FIG. 1, the slurry of the negative electrode mix is applied onto surface of the negative electrode current collector 11, and then dried to form the negative electrode active material layer 12. At this time, a hot press or the like may be carried out as needed. In the way as mentioned above, the negative electrode of the non-aqueous electrolyte secondary battery of the present invention can be produced.

<2. Lithium Ion Secondary Battery>

The non-aqueous electrolyte secondary battery of the present invention includes the negative electrode active material for the non-aqueous electrolyte secondary battery of the present invention. Hereunder, the non-aqueous electrolyte secondary battery of the present invention will be explained by using the laminate film type lithium ion secondary batter as the example thereof.

[Composition of the Laminate Film Type Secondary Battery]

Figure 2:
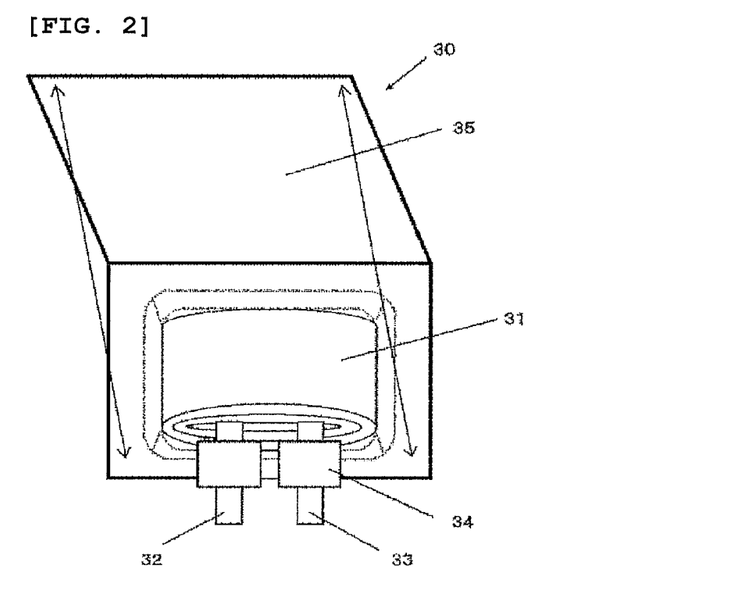
FIG. 2 is an exploded view illustrating a composition example (laminate film type) of the lithium secondary battery which includes the negative electrode active material of the present invention.

A laminate film type lithium ion secondary battery 30 shown in FIG. 2 has a rolled electrode body 31 stored inside an exterior member 35 mainly having a sheet form. This rolled electrode body 31 has a separator between a positive electrode and a negative electrode, and they are rolled. Alternatively, there is a case that a laminate body having the separator between the positive electrode and the negative electrode is stored. In the both electrode bodies, a positive electrode lead 32 is attached to the positive electrode, and a negative electrode lead 33 is attached to the negative electrode. The outermost periphery of the electrode body is protected by a protection tape.

The positive electrode and negative electrode leads 32 and 33 are derived, for example, in one direction from inside to outside of the exterior member 35. The positive electrode lead 32 is formed of a conductive material such as, for example, aluminum; and the negative electrode lead 33 is formed of a conductive material such as, for example, nickel or copper.

The exterior member 35 is a laminate film in which, for example, a melt-adhering layer, a metal layer, and a surface protection layer are laminated in this order. In the laminate film, the melt-adhering layers are melt-adhered or adhered by an adhesive to each other in the outer peripheral portions in the melt-adhering layers of two films such that the melt-adhering layer may face to the electrode body 31. For example, the melt-adhering portion is a film of polyethylene or polypropylene, and a metal portion is an aluminum foil or the like. The protection layer is, for example, nylon.

Between the exterior member 35 and the positive electrode and negative electrode leads, a cling film 34 is inserted in order to prevent an outside air from invading. The material thereof is, for example, polyethylene, polypropylene, or a polyolefin resin.

The positive electrode has a positive electrode active material layer on both or one surface of the positive electrode current collector, for example, in the same way as the negative electrode 10 of FIG. 1.

The positive electrode current collector is formed of a conductive material such as, for example, aluminum.

The positive electrode active material layer includes one, or two or more of positive electrode materials which can adsorb and release a lithium ion, and may include other materials such as a positive electrode binder, a positive electrode conductive additive, and a dispersant, depending on the design thereof. In this case, details of the positive electrode binder and the positive electrode conductive additive are, for example, as same as those of the negative electrode binder and the negative electrode conductive additive as described before.

The positive electrode material is preferably a lithium-containing compound. Illustrative example of the lithium-containing compound includes a composite oxide formed of lithium and a transition metal element, or a phosphoric acid compound having lithium and a transition metal element. Among these positive electrode materials, a compound having at least any one or more of nickel, iron, manganese, and cobalt is preferable. These positive electrode materials are expressed by the chemical formula such as, for example, $Li_xM_1O_2$ or $Li_yM_2PO_4$. In the formulae, $M_1$ and $M_2$ represent at least any one or more of transition metal elements. The values of "x" and "y" are different in the charge or discharge state of the battery; but they are generally $0.05 \leq x \leq 1.10$ and $0.05 \leq y \leq 1.10$.

Illustrative example of the composite oxide formed of lithium and a transition metal element includes a lithium cobalt composite oxide ($Li_xCoO_2$), a lithium nickel composite oxide ($Li_xNiO_2$), and a lithium nickel cobalt composite oxide. Illustrative example of the lithium nickel cobalt composite oxide includes a lithium nickel cobalt aluminum composite oxide (NCA) and a lithium nickel cobalt manganese composite oxide (NCM).

Illustrative example of the phosphoric acid compound having lithium and a transition metal element includes a lithium iron phosphate compound ($LiFePO_4$) and a lithium iron manganese phosphate compound ($LiFe_{1-u}Mn_uPO_4$ ($0<u<1$)). When these positive electrode materials are used, not only a high battery capacity but also an excellent cycle characteristic can be obtained.

[Negative Electrode]

The negative electrode has the same composition as that of the negative electrode 10 for the non-aqueous electrolyte secondary battery shown in FIG. 1, whereby having, for example, the negative electrode active material layer on both surfaces of the current collector. In this negative electrode, it is preferable that the negative electrode charge capacity is greater than the electric capacity (charge capacity as the battery) obtained from the positive electrode active material. With this, deposition of the lithium metal on the negative electrode can be suppressed.

The positive electrode active material layer is arranged on part of both surfaces of the positive electrode current collector; and likewise, the negative electrode active material layer is also arranged on part of both surfaces of the negative electrode current collector. In this case, for example, in the negative electrode active material layer formed on the negative electrode current collector, there is an area in which there is no positive electrode active material layer facing thereto. This is because a stable battery is to be designed.

In the area in which the negative electrode active material layer does not face to the positive electrode active material layer, there is hardly an effect of charge and discharge. Because of this, the state of the negative electrode active material layer immediately after formation thereof can be maintained as it is. Accordingly, the composition, etc. of the negative electrode active material can be accurately and reproducibly studied without depending on charge and discharge.

[Separator]

The separator separates between the negative electrode and the positive electrode, and allows for the lithium ion to pass through it while preventing the short circuit due to contacts of both electrodes. This separator is formed of, for example, a synthetic resin or a porous film formed of ceramic. The separator may have a laminate structure in which two or more porous films are laminated. Illustrative example of the synthetic resin includes polytetrafluoroethylene, polypropylene, and polyethylene.

[Electrolyte Solution]

In at least part of the active material layer or in the separator, a liquid electrolyte (electrolyte solution) is impregnated. In this electrolyte solution, an electrolyte salt is dissolved in a solvent, wherein other material such as an additive may be included.

As to the solvent, for example, a non-aqueous solvent may be used. Illustrative example of the non-aqueous solvent includes ethylene carbonate, propylene carbonate, butylene carbonate, dimethyl carbonate, diethyl carbonate, ethyl methyl carbonate, methyl propyl carbonate, 1,2-dimethoxyethane, and tetrahydrofuran. Among them, at least any one or more of ethylene carbonate, propylene carbonate, dimethyl carbonate, diethyl carbonate, and ethyl methyl carbonate is preferably used. This is because good characteristics can be obtained. In this case, when a high viscous solvent such as ethylene carbonate or propylene carbonate is combined with a low viscous solvent such as dimethyl carbonate, ethyl methyl carbonate, or diethyl carbonate, further enhanced characteristics can be obtained. This is because dissociation of the electrolyte salt as well as ion mobility can be enhanced.

It is preferable to include as a solvent additive a cyclic carbonate ester having an unsaturated carbon bond. This is because a stable film is formed on the negative electrode surface during charging and discharging, so that the decomposition reaction of the electrolyte solution can be suppressed. Illustrative example of the cyclic carbonate ester having an unsaturated carbon bond includes vinylene carbonate and vinyl ethylene carbonate.

In addition, it is preferable to include a sultone (cyclic sulfonate ester) as the solvent additive. This is because a chemical stability of the battery can be enhanced. Illustrative example of the sultone includes propane sultone and propene sultone.

In addition, it is preferable that the solvent includes an acid anhydride. This is because a chemical stability of the electrolyte solution can be enhanced. Illustrative example of the acid anhydride includes propane disulfonic acid anhydride.

The electrolyte salt can include any one or more of a light metal salt such as, for example, a lithium salt. Illustrative example of the lithium salt includes lithium hexafluorophosphate ($LiPF_6$) and lithium terafluoroborate ($LiBF_4$).

Content of the electrolyte salt is preferably 0.5 mol/kg or more and 2.5 mol/kg or lower relative to the solvent. This is because a high ionic conductivity can be obtained.

[Method for Producing the Laminate Film Type Secondary Battery]

At first, the positive electrode is produced by using the positive electrode material as mentioned above. First, the positive electrode active material is mixed, as needed, with a positive electrode binder, a positive electrode conductive additive, etc. to obtain the positive electrode material mix, which is then dispersed into an organic solvent to obtain a slurry of the positive electrode material mix. Next, the material mix slurry is applied onto the positive electrode current collector by using a coating machine such as a die coater having a knife roll or a die head, and then, it is dried by a hot air to obtain the positive electrode active material layer. Finally, the positive electrode active material layer is press molded by a roll press machine or the like. At this time, heating or repetition of pressing may be made for plural times.

Next, by following the same working procedure as production of the negative electrode 10 for the lithium ion secondary battery as mentioned before, the negative electrode active material layer is formed on the negative electrode current collector to obtain the negative electrode.

Upon producing the positive electrode and the negative electrode, the active material layer of each is formed on both surfaces of the positive electrode and negative electrode current collectors. At this time, the active material coating length of the both surface portions may be off in any of the electrodes (see, FIG. 1).

Next, the electrolyte solution is prepared. Next, by an ultrasonic welding or the like, the positive electrode lead 32 is attached to the positive electrode current collector, and also the negative electrode lead 33 is attached to the negative electrode current collector (see, FIG. 2). Next, the positive electrode and the negative electrode are laminated or rolled via the separator to obtain the rolled electrode body 31, which is then followed by adhesion of the protection film on the outermost peripheral portion thereof. Next, the rolled body is molded so as to be a flat form. Next, after the rolled electrode body is sandwiched between the exterior members 35 in a film form and folded, the insulation portions of the exterior members are adhered to each other by a thermal adhesion method so as to seal the rolled electrode body with an open state only in one direction. Next, the cling films are inserted between the exterior member and the positive electrode lead and between the exterior member and the negative electrode lead. Next, after the predetermined amount of the electrolyte solution previously prepared is charged from the open portion, vacuum impregnation is carried out. After the impregnation, the open portion is adhered by a vacuum thermal adhesion. In the way as mentioned above, the laminate film type secondary battery 30 can be produced.

In the non-aqueous secondary battery of the present invention such as the laminate film type secondary battery 30 produced above, the negative electrode utility rate during charging and discharging is preferably 93% or more and 99% or less. When the negative electrode utility rate is made in the range of 93% or more, the first charge efficiency is not decreased so that the battery capacity can be enhanced furthermore. When the negative electrode utility rate is made in the range of 99% or less, Li is not deposited so that the safety thereof can be ensured.

EXAMPLES

Hereunder, the present invention will be specifically explained by showing Examples of the present invention and Comparative Examples; however, the present invention is not limited to these Examples.

Example 1-1

According to the following procedure, the laminate film type secondary battery 30 shown in FIG. 2 was produced.

First, the positive electrode was produced. The positive electrode material mix was prepared by mixing 95 parts by mass of lithium nickel cobalt aluminum composite oxide ($LiNi_{0.7}Co_{0.25}Al_{0.05}O$) as the positive electrode active material, 2.5 parts by mass of the positive electrode conductive additive (acetylene black), and 2.5 parts by mass of the positive electrode binder (polyvinylidene fluoride: PVDF). Next, the positive electrode material mix was dispersed into the organic solvent (N-methyl-2-pyrrolidone; NMP) to obtain a slurry in a paste form. Next, by using a coating machine having a die head, the slurry was applied onto both surfaces of the positive electrode current collector, and then, it was dried with a hot air drying equipment. At this time, the positive electrode current collector having a thickness of 15 µm was used. Finally, the press molding thereof was carried out by a roll press.

Next, the negative electrode was prepared. First, the silicon-based active material was prepared as follows. A mixture of metal silicon and silicon dioxide was introduced as the raw material (gasification starting material) into a reaction furnace, and the mixture was gasified in an atmosphere with the vacuum degree of 10 Pa so as to deposit the resulting gas onto an adsorbing plate. After the deposited material was sufficiently cooled down, it was taken out and crushed by a ball mill to obtain silicon oxide particle (silicon compound particle). After the particle size of the silicon oxide particle was adjusted, the thermal decomposition CVD was carried out to form the carbon coat layer.

Next, under an argon atmosphere the silicon oxide particle having been formed with the carbon coat layer was mixed with 4% by mass of LiH powder, this amount being relative to the silicon oxide particle. After the resulting mixture was stirred with a shaker, the stirred powder was subjected to a heat treatment at 740° C. in an atmosphere control furnace so as to carry out the modification by inserting lithium into the silicon oxide particle.

Next, the silicon oxide particle after modification was charged into a mixed solution of ethanol and aluminum phosphate monobasic; and then, after the resulting mixture was stirred, it was filtrated to collect a solid material, which was then dried to remove ethanol. With this, aluminum phosphate monobasic was adhered to surface of the silicon oxide particle as well as surface of the carbon coat layer. At this time, the silicon oxide particle after modification was covered with aluminum phosphate monobasic. Accordingly, the silicon-based active material particle formed of the silicon oxide particle having the carbon coat layer as well as the phosphate salt layer on the surface thereof was prepared.

Next, the silicon-based active material particle and the carbon-based active material were blended with the mass ratio of 1:9 to obtain the negative electrode active material. Meanwhile, as to the carbon-based active material, a mixture of natural graphite and artificial graphite with the mass ratio of 5:5, covered with a pitch layer, was used. The median size of the carbon-based active material was 20 µm.

Next, the negative electrode active material thus obtained, the conductive additive 1 (carbon nanotube; CNT), the conductive additive 2 (carbon microparticles with the median size of about 50 nm), the styrene butadiene rubber (styrene-butadiene copolymer; hereinafter, this is referred to as SBR), and the carboxymethyl cellulose (hereinafter, this is referred to as CMC) were mixed with the dry mass ratio of 92.5:1:1:2.5:3; and then, the resulting mixture was diluted with pure water to obtain the negative electrode material mix slurry. Meanwhile, SBR and CMC mentioned above are the negative electrode binders. Here, in order to measure the stability of the negative electrode material mix slurry, part (30 g) of the negative electrode material mix slurry thus prepared was separated from the negative electrode material mix slurry for production of the secondary battery; and then, it was kept at 20° C. to confirm the gas generation situation after 6 hours, 24 hours, 48 hours, 72 hours, 96 hours, 120 hours, 144 hours, and 1 week (168 hours), as well as the sedimentation situation after 48 hours, both confirmations being started from preparation of the negative electrode material mix slurry.

As to the negative electrode current collector, an electrolysis copper foil (thickness of 15 μm) was used. Finally, the negative electrode material mix slurry was applied onto the negative electrode current collector; and then, it was dried under vacuum atmosphere at 100° C. for 1 hour. The deposition amount of the negative electrode active material layer per a unit area in one surface of the negative electrode after drying was 5 mg/cm² (this is also referred to as the area density).

Next, after fluoroethylene carbonate (FEC), ethylene carbonate (EC), and diethyl carbonate (DEC) were mixed as the solvent, the electrolyte salt (lithium hexafluorophosphate: $LiPF_6$) was dissolved into this solvent mixture to obtain the electrolyte solution. In this case, the solvent composition of FEC:EC:DEC=1:2:7 as the volume ratio was used while the content of the electrolyte salt was made 1.0 mol/kg relative to the solvent. Further, 1.5% by mass of vinylene carbonate (VC) was added to the electrolyte solution thus obtained.

Next, the secondary battery was fabricated as follows. First, an aluminum lead was attached to one end of the positive electrode current collector with an ultrasonic welding, and also a nickel lead was welded to the negative electrode current collector. Next, the positive electrode, the separator, the negative electrode, and the separator were laminated in this order, and then, the laminate thus formed was rolled in the longitude direction to obtain the rolled electrode body. The roll end portion thereof was fixed by a PET protection tape. As to the separator, a laminate film with the thickness of 12 μm, formed by sandwiching the film containing porous polyethylene as a main component by the films containing porous polypropylene as a main component, was used. Next, after the electrode body was sandwiched by the exterior members, the outer peripheral portions thereof except for one side were thermally adhered to each other so as to store the electrode body therein. As to the exterior member, the aluminum laminate film formed by laminating a nylon film, an aluminum foil, and a polypropylene film was used. Next, from the open portion, the prepared electrolyte solution was charged; and after impregnation was carried out under vacuum atmosphere, the open portion was sealed by thermal adhesion.

The cycle characteristic of the secondary battery thus fabricated was evaluated.

The cycle characteristic was studied as follows. First, in order to stabilize the battery, two cycles of charge and discharge were carried out at the atmospheric temperature of 25° C. with 0.2 C; and the discharge capacity at the second cycle was measured. Next, the charge and discharge were carried out until the total cycle number reached 499 cycles, wherein the discharge capacity was measured at each cycle. Finally, the discharge capacity at the 500th cycle obtained with the 0.2 C charge and discharge was divided with the discharge capacity at the second cycle to calculate the capacity retention rate (hereinafter, this is sometimes referred to as simply "retention rate"). In the normal cycle, namely, from the 3rd cycle to the 499th cycle, the charge and discharge were done with the 0.7 C charge and the 0.5 C discharge.

Also, the first efficiency of the silicon-based active material alone ($SiO_x$ alone) was calculated as follows. First, the silicon-based active material obtained above and polyacrylic acid were mixed with the mass ratio of 85:15, and then, this mixture was applied onto a copper foil. At this time, the area density of the mixture applied was about 2 mg/cm². Then, after it was dried under vacuum at 90° C. for 1 hour, as the form of a coin cell with the size of 2032, the constant current and constant voltage charge was started by using the counter Li with the voltage of 0 V and the current density of 0.2 mA/cm². Then, the constant current and constant voltage charge was terminated when the current value reached 0.1 mA. Next, the constant current discharge was carried out, and the discharge was terminated when the voltage reached 1.2 V. The current density during discharging was made as same as that during charging. When the condition for input of Li into the negative electrode is regarded as charge and the condition for output of Li from the negative electrode is regarded as discharge, the initial efficiency of the silicon-based active material alone ($SiO_x$ alone) is (discharge capacity)/(charge capacity)×100(%). By using this equation, the $SiO_x$-alone first efficiency was calculated.

Example 1-2

The cycle characteristic, etc. of the secondary battery were evaluated with the same procedure as that of Example 1-1, except that aluminum phosphate dibasic was used as the coating material (adherent).

Example 1-3

The cycle characteristic, etc. of the secondary battery were evaluated with the same procedure as that of Example 1-1, except that aluminum phosphate tribasic was used as the coating material.

Example 1-4

The cycle characteristic, etc. of the secondary battery were evaluated with the same procedure as that of Example 1-1, except that ammonium phosphate was used as the coating material.

Example 1-5

The cycle characteristic, etc. of the secondary battery were evaluated with the same procedure as that of Example 1-1, except that diammonium phosphate was used as the coating material.

Example 1-6

The cycle characteristic, etc. of the secondary battery were evaluated with the same procedure as that of Example 1-1, except that aluminum phosphate tribasic and ammonium phosphate were used as the coating materials. At this time, content of aluminum phosphate tribasic was made 2% by mass relative to the silicon compound particle; and content of ammonium phosphate was made 1% by mass relative to the silicon compound particle.

Example 1-7

The cycle characteristic, etc. of the secondary battery were evaluated with the same procedure as that of Example 1-1, except that aluminum phosphate tribasic and diammonium phosphate were used as the coating materials. At this time, content of aluminum phosphate tribasic was made 2% by mass relative to the silicon compound particle; and content of diammonium phosphate was made 1% by mass relative to the silicon compound particle.

Example 1-8

The cycle characteristic, etc. of the secondary battery were evaluated with the same procedure as that of Example 1-3, except that the method for adhering the phosphate salt to surface of the silicon oxide particle was changed from the wet mixing method to the dry mixing method using Hosokawa Micron Nobilta® NOB. Specifically, 3 g of aluminum phosphate tribasic was added to 100 g of silicon oxide particle ($SiO_x$), and then, the resulting mixture was treated with Nobilta (Nobilta treatment) so as to adhere aluminum phosphate tribasic to surface of the silicon oxide particle. The time of the Nobilta treatment was 30 seconds.

Example 1-9

The cycle characteristic, etc. of the secondary battery were evaluated with the same procedure as that of Example 1-3, except that the method for adhering the phosphate salt to surface of the silicon oxide particle was changed from the wet mixing method to the dry mixing method using Hosokawa Micron Nauta Mixer® DBX. Specifically, 3 g of aluminum phosphate tribasic was added to 100 g of silicon oxide particle ($SiO_x$), and then, the resulting mixture was mixed by using Nauta Mixer so as to adhere aluminum phosphate tribasic to surface of the silicon oxide particle. The time of mixing was 1 hour.

Comparative Example 1-1

The cycle characteristic, etc. of the secondary battery were evaluated with the same procedure as that of Example 1-1, except that insertion of lithium into the silicon oxide particle and adhesion of the phosphate salt thereto were not carried out.

Comparative Example 1-2

The cycle characteristic, etc. of the secondary battery were evaluated with the same procedure as that of Example 1-1, except that adhesion of the phosphate salt was not carried out.

Figure 3:
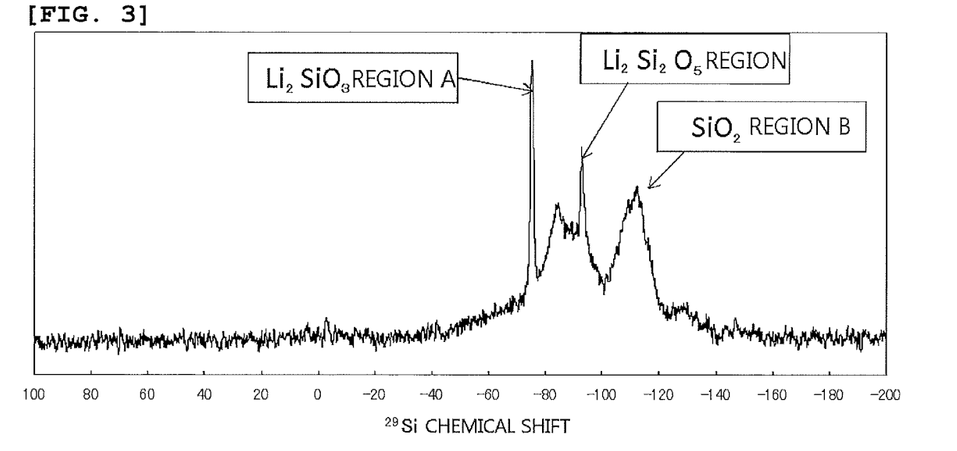
FIG. 3 is a $^{29}$Si-MAS-NMR spectrum measured from the silicon compound particle in Example 1-3.

As shown in Table 1 below, in all of Examples and Comparative Examples, x of the silicon compound represented by $SiO_x$ was 1, and the median size $D_{50}$ of the silicon compound particle was 4 μm. Meanwhile, in Table 1, "A" indicates the maximum strength of the peak attributable to $Li_2SiO_3$, and "B" is the strength of the peak attributable to the silicon dioxide state ($SiO_2$ region). In FIG. 3, the $^{29}Si$-MAS-NMR spectrum measured from the silicon compound particle in Example 1-3 is shown. As can be seen in FIG. 3, in Example 1-3, the relationship between "A" and "B" was A>B.

Evaluation results of Examples 1-1 to 1-9 and Comparative Examples 1-1 to 1-2 are shown in Table 1.

TABLE 1

$SiO_x$: x = 1, $D_{50}$ = 4 μm, carbon coat layer: present,
$SiO_x$ ratio: 10% by mass (to active material),
$SiO_x$-alone first efficiency: 0 V to 1.2 V (to Li)

| | Composition of coating material | Coating material (% by mass) | $Li_2SiO_3$ presence | $Li_2Si_2O_5$ presence | $SiO_x$-alone initial efficiency (%) | Half width Θ | Si (111) Crystallite size (nm) |
|---|---|---|---|---|---|---|---|
| Comparative Example 1-1 | — | — | No | No | 70 | 2.593 | 3.29 |
| Comparative Example 1-2 | — | — | Yes | Yes | 80 | 1.271 | 6.63 |
| Example 1-1 | aluminum phosphate monobasic Al($H_2PO_4$)$_3$ | 3 | Yes | Yes | 80 | 1.271 | 6.63 |
| Example 1-2 | aluminum phosphate dibasic $Al_2$($HPO_4$)$_3$ | 3 | Yes | Yes | 80 | 1.271 | 6.63 |
| Example 1-3 | aluminum phosphate tribasic $AlPO_4$ | 3 | Yes | Yes | 80 | 1.271 | 6.63 |
| Example 1-4 | ammonium phosphate ($NH_4$)$_3PO_4$ | 3 | Yes | Yes | 80 | 1.271 | 6.63 |
| Example 1-5 | diammonium phosphate ($NH_4$)$_2HPO_4$ | 3 | Yes | Yes | 80 | 1.271 | 6.63 |
| Example 1-6 | aluminum phosphate tribasic $AlPO_4$/ ammonium phosphate | 2/1 | Yes | Yes | 80 | 1.271 | 6.63 |

TABLE 1-continued

SiO$_x$: x = 1, D$_{50}$ = 4 μm, carbon coat layer: present,
SiO$_x$ ratio: 10% by mass (to active material),
SiO$_x$-alone first efficiency: 0 V to 1.2 V (to Li)

| | | | | | | | |
|---|---|---|---|---|---|---|---|
| Example 1-7 | aluminum phosphate tribasic AlPO$_4$/ diammonium phosphate (NH$_4$)$_2$HPO$_4$ | 2/1 | Yes | Yes | 80 | 1.271 | 6.63 |
| Example 1-8 | aluminum phosphate tribasic AlPO$_4$ | 3 | Yes | Yes | 80 | 1.271 | 6.63 |
| Example 1-9 | aluminum phosphate tribasic AlPO$_4$ | 3 | Yes | Yes | 80 | 1.271 | 6.63 |

| | Modification method | A, B | Capacity retention rate (%) | Time till gas generation | Sedimentation after 48 hours | Mixing method |
|---|---|---|---|---|---|---|
| Comparative Example 1-1 | No | — | 71 | No gas | No | Wet mixing |
| Comparative Example 1-2 | Thermal doping | A > B | 45 | 6 hrs | Yes | Wet mixing |
| Example 1-1 | Thermal Doping | A > B | 75 | 96 hrs | No | Wet mixing |
| Example 1-2 | Thermal Doping | A > B | 78 | 72 hrs | No | Wet mixing |
| Example 1-3 | Thermal Doping | A > B | 78 | 168 hrs | No | Wet mixing |
| Example 1-4 | Thermal Doping | A > B | 78 | 48 hrs | No | Wet mixing |
| Example 1-5 | Thermal Doping | A > B | 78 | 48 hrs | No | Wet mixing |
| Example 1-6 | Thermal Doping | A > B | 79 | 192 hrs | No | Wet mixing |
| Example 1-7 | Thermal Doping | A > B | 79 | 192 hrs | No | Wet mixing |
| Example 1-8 | Thermal Doping | A > B | 78 | 168 hrs | No | Dry mixing |
| Example 1-9 | Thermal doping | A > B | 78 | 168 hrs | No | Dry mixing |

As can be seen in Table 1, when the modification is not carried out (Comparative Example 1-1), the SiO$_x$-alone first efficiency is so low that enhancement in the battery capacity is difficult. However, the slurry is stable, and the battery cycle characteristic is excellent, too. Comparative Example 1-2 is the example in which modification is carried out by using the Li source in order to enhance the battery capacity. At this time, Li silicate is formed inside the silicon compound particle which includes the Li compound. Because stability of Li silicate to the aqueous slurry is so low, elution thereof takes place. Therefore, hydrogen is generated from the slurry so that industrially this is not feasible. Examples 1-1 to 1-3 are the examples in which the slurry is prepared by using any one of the aluminum phosphate monobasic to tribasic so as to adhere it to the outermost surface of the silicon compound particle. In these cases, stability of the slurry is significantly enhanced as compared with Comparative Example 1-2. Examples 1-4 and 1-5 are the examples in which the slurry is prepared by using any one of the ammonium phosphates so as to adhere it to the outermost surface of the silicon compound particle. In these cases, too, good results are obtained. Examples 1-6 and 1-7 are the examples in which the slurry is prepared by using both of the aluminum phosphate and the ammonium phosphates so as to adhere them to the outermost surface of the silicon compound particle. In these cases, especially good results are obtained. Examples 1-8 and 1-9 are the examples in which the dry mixing method is used as the method for adhering the phosphate salt to surface of the silicon oxide particle. Even with this method, similarly to Examples 1-1 to 1-7 in which the wet mixing method is used, good results are obtained.

Examples 2-1 to 2-7

The cycle characteristic, etc. of the secondary battery were evaluated with the same procedure as that of Example 1-3, except that amount of the aluminum phosphate tribasic as the coating material was changed as described in Table 2. These results are summarized in Table 2. Meanwhile, the amount of the coating material is expressed relative to the mass of the silicon compound particle. In Tables 2-7, "Li silicate: present" means that the silicon compound particle includes Li$_2$SiO$_3$ and Li$_2$Si$_2$O$_5$.

TABLE 2

$SiO_x$: x = 1, $SiO_x$ ratio: 10% by mass (to active material),
$SiO_x$-alone first efficiency: 80%, coating material: $AlPO_4$,
carbon coat layer: present, half width: 1.271,
crystallite: 6.63 nm, modification method: thermal doping, A > B,
Li silicate: present

|  | Coating material (% by mass) | Capacity retention rate (%) | Time till gas generation | Sedimentation after 48 hours |
|---|---|---|---|---|
| Example 2-1 | 0.05 | 75 | 72 hrs | No |
| Example 2-2 | 0.1 | 76 | 96 hrs | No |
| Example 2-3 | 0.5 | 77 | 120 hrs | No |
| Example 2-4 | 1.5 | 78 | 168 hrs | No |
| Example 1-3 | 3 | 78 | 168 hrs | No |
| Example 2-5 | 5 | 78 | 168 hrs | No |
| Example 2-6 | 7 | 78 | 168 hrs | No |
| Example 2-7 | 10 | 74 | 168 hrs | No |

In general, it is preferable that the slurry is stable for 3 days (it can happen that the slurry is prepared, for example, on Friday and application thereof starts from Monday). From this viewpoint, it is presumed that the industrially feasible amount of the coating material is 0.1% by mass or more. However, even though amount of the coating material is small, stability of the slurry is enhanced as compared with Comparative Example 1-2. When amount of the coating material is 7% by mass or less, generation of a gas is suppressed and the thixotropy of the slurry is not too high, thereby leading to less trouble in the application process. Therefore, the state of electrode is stabilized so well that the battery characteristics can be enhanced.

Examples 3-1 to 3-4

The cycle characteristic, etc. of the secondary battery were evaluated with the same procedure as that of Example 1-3, except that oxygen amount of the silicon compound was changed as described in Table 3. These results are summarized in Table 3.

TABLE 3

$SiO_x$ ratio: 10% by mass (to active material),
$SiO_x$-alone first efficiency: 80%, $AlPO_4$ coating material: 3% by mass,
carbon coat layer: present, half width: 1.271, crystallite: 6.63 nm,
modification method: thermal doping, A > B, Li silicate: present

|  | $SiO_x$: x= | Capacity retention rate (%) | Time till gas generation | Sedimentation after 48 hours |
|---|---|---|---|---|
| Example 3-1 | 0.3 | 61 | 96 hrs | No |
| Example 3-2 | 0.5 | 70 | 120 hrs | No |
| Example 1-3 | 1 | 78 | 168 hrs | No |
| Example 3-3 | 1.6 | 76 | 168 hrs | No |
| Example 3-4 | 1.8 | — | 168 hrs | No |

As can be seen in Table 3, when amount of oxygen in the silicon compound was increased, namely, when x was 0.5≤x, the capacity retention rate increased. It is presumed that when x was 0.5≤x, especially 1≤x, the existence rate of Li silicate at the time of Li doping was sufficient so that the bulk was stabilized, and therefore, generation of gas and sedimentation became sluggish in the slurry. When x was x≤1.6, resistance of the silicon oxide was not too high so that not only the battery evaluation could be readily performed but also the capacity retention rate was excellent.

Example 4-1

The cycle characteristic, etc. of the secondary battery were evaluated with the same procedure as that of Example 1-3, except that the charging amount of LiH was made half of Example 1-3 so as to control the amount of the formed Li compound. The results thereof are shown in Table 4.

TABLE 4

$SiO_x$: x = 1, $SiO_x$ ratio: 10% by mass (to active material),
$AlPO_4$ coating material: 3% by mass, carbon coat layer: present,
half width: 1.271, crystallite: 6.63 nm,
modification method: thermal doping, Li silicate: present

|  | $SiO_x$-alone first efficiency (%) | A, B | Capacity retention rate (%) | Time till gas generation | Sedimentation after 48 hours |
|---|---|---|---|---|---|
| Example 1-3 | 80 | A > B | 78 | 168 hrs | No |
| Example 4-1 | 75 | A < B | 78 | 168 hrs | No |

As can be seen in Table 4, in Example 4-1 in which the charging amount of LiH was made half of Example 1-3, although the $SiO_x$-alone first efficiency could be enhanced as compared with Comparative Example 1-1, the gain thereof was about half of Example 1-3. The relationship between "A" and "B" was A>B in Example 1-3, but A<B in Example 4-1. From this, it became clear that when the $SiO_x$-alone first efficiency is especially high, as high as 80% or more, "A" and "B" are in the relationship of A>B.

Examples 5-1 to 5-6

The cycle characteristic, etc. of the secondary battery were evaluated with the same procedure as that of Example 1-3, except that the crystallinity of the silicon compound particle was changed. These results are summarized in Table 5.

TABLE 5

$SiO_x$: x = 1, $D_{50}$ = 4 μm, $AlPO_4$ coating material: 3% by mass,
$SiO_x$ ratio: 10% by mass (to active material),
$SiO_x$-alone first efficiency: 80%, carbon coat layer: present, A > B,
Li silicate: present

|  | Half width Θ | Si (111) crystallite's size (nm) | Capacity retention rate (%) | Time till gas generation | Sedimentation after 48 hours |
|---|---|---|---|---|---|
| Example 5-1 | 0.756 | 11.42 | 66 | 168 hrs | No |
| Example 5-2 | 0.796 | 10.84 | 68 | 168 hrs | No |
| Example 5-3 | 1.025 | 8.55 | 69 | 168 hrs | No |
| Example 5-4 | 1.218 | 7.21 | 73 | 168 hrs | No |

TABLE 5-continued

SiO$_x$: x = 1, D$_{50}$ = 4 μm, AlPO$_4$ coating material: 3% by mass,
SiO$_x$ ratio: 10% by mass (to active material),
SiO$_x$-alone first efficiency: 80%, carbon coat layer: present, A > B,
Li silicate: present

|  | Half width Θ | Si (111) crystallite's size (nm) | Capacity retention rate (%) | Time till gas generation | Sedimentation after 48 hours |
|---|---|---|---|---|---|
| Example 1-3 | 1.271 | 6.63 | 78 | 168 hrs | No |
| Example 5-5 | 1.845 | 4.62 | 79 | 168 hrs | No |
| Example 5-6 | 2.257 | 3.77 | 79 | 168 hrs | No |

The half-value width (2θ) of the diffraction peak attributable to the Si(111) crystal surface obtained from X-ray diffraction of the silicon compound particle after modification in Example 1-3 was 1.271°, and the crystallite's size attributable to the crystal surface Si(111) thereof was 6.63 nm. This is because the thermal doping method was used for modification; this method leads to disproportionation in part of the silicon compound, thereby facilitating crystallization. The silicon compound particle after modification included lithium silicate. When crystallinity is low, the Si grain does not grow so much even with repeated charge and discharge; and thus, decrease in the battery cycle characteristic is prone to be sluggish. As can be seen in Table 5, the slurry stability, which can be obtained from the time till gas generation, etc., could be retained even when the crystallinity of the silicon compound particle was changed.

Example 6-1

The cycle characteristic, etc. of the secondary battery were evaluated with the same procedure as that of Example 1-3, except that the carbon coat layer was not formed. The results thereof are shown in Table 6.

TABLE 6

SiO$_x$: x = 1, SiO$_x$ ratio: 10% by mass (to active material),
SiO$_x$-alone first efficiency: 80%, AlPO$_4$ coating material: 3% by mass,
half width: 1.271, crystallite: 6.63 nm,
modification method: thermal doping, A > B, Li silicate: present

|  | Carbon coat layer | Capacity retention rate (%) | Time till gas generation | Sedimentation after 48 hours |
|---|---|---|---|---|
| Example 1-3 | Present | 78 | 168 hrs | No |
| Example 6-1 | No | 71 | 168 hrs | No |

As can be seen in Example 1-3, when the carbon coat layer was formed, the conductivity could be enhanced, thereby leading to enhancement of the battery characteristics.

Examples 7-1 to 7-6

The cycle characteristic, etc. of the secondary battery were evaluated with the same procedure as that of Example 1-3, except that the median size of the silicon compound particle was changed as described in Table 7. These results are summarized in Table 7.

TABLE 7

SiO$_x$: x = 1, aluminum phosphate tribasic: 3% by mass,
SiO$_x$ ratio: 10% by mass (to active material),
SiO$_x$-alone first efficiency: 80%, carbon coat layer: present,
half width: 1.271, crystallite: 6.63 nm,
modification method: thermal doping, A > B, Li silicate: present

|  | Median size (μm) | Capacity retention rate (%) | Time till gas generation | Sedimentation after 48 hours |
|---|---|---|---|---|
| Example 7-1 | 0.1 | 68 | 120 hrs | No |
| Example 7-2 | 0.5 | 70 | 168 hrs | No |
| Example 7-3 | 1 | 73 | 168 hrs | No |
| Example 1-3 | 4 | 78 | 168 hrs | No |
| Example 7-4 | 10 | 78 | 168 hrs | No |
| Example 7-5 | 15 | 74 | 168 hrs | No |
| Example 7-6 | 20 | 69 | 168 hrs | No |

As can be seen in Table 7, when the median size of the silicon compound particle was 0.5 μm or more, the specific surface area was not too large; as a result, the gas generation was difficult to take place. When the median size of the silicon compound particle is 15 μm or less, the expansion and contraction stress by the charge and discharge decreases, so that the negative electrode active material layer is not readily broken during charging and discharging. In addition, the silicon compound particle is difficult to be cracked, so that the battery cycle characteristic is difficult to be decreased.

It must be noted here that the present invention is not limited to the embodiments as described above. The foregoing embodiments are mere examples; any form having substantially the same composition as the technical idea described in claims of the present invention and showing similar effects is included in the technical scope of the present invention.

The invention claimed is:

1. A negative electrode active material for a non-aqueous electrolyte secondary battery, the negative electrode active material comprising negative electrode active material particles, wherein:
   the negative electrode active material particles comprise a silicon compound particle which comprises a silicon compound comprising oxygen,
   the silicon compound particle comprises a Li compound,
   the silicon compound particle is adhered with a phosphate salt in an outermost surface layer thereof,
   the phosphate salt is at least one of an aluminum phosphate salt and an ammonium phosphate salt, and
   a content of the phosphate salt is 0.1% by mass or more and 7% by mass or less relative to the silicon compound particle.

2. The negative electrode active material for a non-aqueous electrolyte secondary battery according to claim 1, wherein the Li compound is one or more selected from Li$_2$SiO$_3$ and Li$_2$Si$_2$O$_5$.

3. The negative electrode active material for a non-aqueous electrolyte secondary battery according to claim 1, wherein the aluminum phosphate salt is aluminum phosphate tribasic.

4. The negative electrode active material for a non-aqueous electrolyte secondary battery according to claim 1, wherein the ammonium phosphate salt is at least one of ammonium phosphate and diammonium phosphate.

5. The negative electrode active material for a non-aqueous electrolyte secondary battery according to claim 1, wherein the silicon compound particle has both the aluminum phosphate salt and the ammonium phosphate salt adhered to an outermost surface layer thereof.

6. The negative electrode active material for a non-aqueous electrolyte secondary battery according to claim 1, wherein the negative electrode active material further has a carbon coat layer between the phosphate salt and the silicon compound particle.

7. The negative electrode active material for a non-aqueous electrolyte secondary battery according to claim 1, wherein a ratio of silicon to oxygen, the elements constituting the silicon compound, is in a range of $0.5 \leq x \leq 1.6$ as $SiO_x$.

8. The negative electrode active material for a non-aqueous electrolyte secondary battery according to claim 1, wherein at least part of an oxygen component that constitutes the silicon compound is present as being bonded to silicon in a state of silicon dioxide, wherein among peaks obtained from a $^{29}Si$-MAS-NMR spectrum, strength of a peak derived from the state of silicon dioxide is smaller than a maximum strength of a peak derived from $Li_2SiO_3$.

9. The negative electrode active material for a non-aqueous electrolyte secondary battery according to claim 1, wherein in the silicon compound particle, a half-value width ($2\theta$) of a diffraction peak attributable to a Si(111) crystal surface obtained from an X-ray-diffraction is 1.2° or more, and that a crystallite's size attributable to this crystal surface is 7.5 nm or less.

10. The negative electrode active material for a non-aqueous electrolyte secondary battery according to claim 1, wherein a median size of the silicon compound particle is 0.5 μm or more and 15 μm or less.

11. A non-aqueous secondary battery, comprising the negative electrode active material for a non-aqueous secondary battery according to claim 1;
a positive electrode; and
an ion conducting electrolyte.

12. A method for producing a negative electrode material for a non-aqueous electrolyte secondary battery, the negative electrode material comprising negative electrode active material particles which comprise a silicon compound particle, the method comprising:
producing a silicon compound particle which comprises a silicon compound comprising oxygen;
modifying the silicon compound particle by inserting Li into the silicon compound particle; and
adhering a phosphate salt that is at least one of an aluminum phosphate salt and an ammonium phosphate salt on a surface of the silicon compound particle after modification, thereby producing the negative electrode material for the non-aqueous aqueous electrolyte secondary battery, wherein a content of the phosphate salt is 0.1% by mass or more and 7% by mass or less relative to the silicon compound particle.

* * * * *